Patented May 28, 1940

2,202,448

UNITED STATES PATENT OFFICE 2,202,448

PROCESS OF PREPARING HIGHER LACTONES CONTAINING AT LEAST 11 CARBON ATOMS AND AT LEAST 2 HETEROCYCLICALLY BOUND OXYGEN ATOMS IN THE LACTONE RING

Roger Firmenich, Geneva, Switzerland, assignor to firm Firmenich and Cie., Successors of Societe Anonyme M. Naef & Cie., Geneva, Switzerland No Drawing. Application September 25, 1935, Serial No. 42,142. In Germany September 28, 1934

12 Claims. (Cl. 260—344)

This invention relates to a process of preparing higher lactones containing at least 11 carbon atoms and at least 2 heterocyclically bound oxygen atoms in the lactone ring which has the general formula

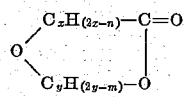

wherein $n$ may be a whole number from 0 to $x$, $m$ a whole number from 0 to $y$, and $x$ and $y$ two whole numbers giving a sum of at least 10 and at most 15. This process consists in subjecting to lactonisation, while heating, hydroxycarboxylic acids having the general formula

HO—R—COOH where R denotes an aliphatic radical of the general formula —$C_xH_{2x-n}$—O—$C_yH_{2y-m}$—, wherein $n$ and $m$ may be whole numbers from 0 to $x$ and $y$, respectively, whilst $x+y$ are whole numbers giving a sum of from 10 to 15, containing at least ten but not more than 15 carbon atoms linked in a chain and containing at least one oxygen atom linked in the form of ether. The said hydroxycarboxylic acids are heated while dissolved in a solvent in a dilution which corresponds with the desired yield of lactone.

It is known that hydroxycarboxylic acids of the general formula OH—R—COOH, where R denotes an organic radical containing at least 11 carbon atoms linked together in a chain, may be transformed into the corresponding lactones if the said acids are heated in a highly diluted state in an indifferent solvent in the presence of a water-splitting catalyst such as for example, benzenesulfonic acid.

It has been found that it is of just as little importance whether the radical R contains in addition still one or several ether-like bound oxygen atoms or not. The result of the lactonisation thus operated does not only undergo no change to the worse owing to the presence of the etheroxygen but, to the contrary, rather an improvement. The important point is that the number of carbon- and oxygen atoms linked in the form of a chain amounts to at least 11.

Thus the invention concerns a further development of the process according to the known processes. The characteristics of the new process consists in subjecting to lactonisation whilst heating hydrocarboxylic acids of formula

HO—R—COOH where R denotes an aliphatic radical containing at least 10 carbon atoms linked in the form of a chain and containing furthermore at least one oxygen atom linked in the form of ether, and this ether in a dilution corresponding with the desired yield of lactone, homogenically dissolved in an organic solvent.

Particularly good results were obtained by lactonising in solvents forming with water azeotropic mixtures including heterogeneous azeotropes such as benzene and water and this by means of water-splitting catalysts.

The lactones prepared according to the present process are intended to be used in perfume industry.

*Example 1*

10 grams of monoether of diethyleneglycol-(11-hydroxyundecanoic-acid-1) having a melting point 53° to 54° C., $$OH(CH_2)_2O(CH_2)_2O(CH_2)_{10}COOH$$

prepared by treating monosodiumdiethyleneglycol with methylester of ω-bromundecane acid and subsequent saponification are added within 24 hours to the reflux of a benzene solution of 10 g. of benzosulfonic acid. After 19 hours already 0.45 cubic centimetre of water are separated. After 37 hours the experiment is stopped. The quantity of water thus separated amounts to 0.7 cubic centimetre. The benzene solution is washed by means of water and a solution of soda and the benzol is distilled off in the vacuum. The residue is digested with pentane and filtered in icy cold condition. Thus 8.5 g. of soluble products are obtained. They are distilled in the high vacuum; the lactone of the monoether of diethylenegiycol-11-hydroxyundecanoic acid-1 resulting in an 80 per cent yield boils under 0.2 mm. pressure at 134° C.; its physical constancies being as follows:

refraction index—

$$n_D^{23} = 1.4662$$

density—

$$d_4^{23} = 1.017$$

It has a distinct odour of musk.

*Example 2*

10 gr. of monoether of trimethyleneglycol-11-hydroxyundecanoic-acid-1

$$OH(CH_2)_3O(CH_2)_{10}COOH$$

(melting point 50° C.) are dissolved in 10 litres benzene, the solution being heated until it boils. Thereupon 6 gr. of benzolsulfonic acid, dehydrated in 100 cubic centimetres of benzene, are added. After 24 hours the reaction is terminated. The further proceedings are the same as described in Example 1. The lactone boils under 0.01 mm. pressure at 88° to 91° C.

Its melting point is +15° C.

Its physical constancies are:

density—

$$d_4^{18°} = 0.9909$$

refraction index—

$$n_D^{18°} = 1.4670$$

The yield is 75% of the theory.

The lactone has intensive smell of musk.

Example 3

10 gr. of monoether of butyleneglycol-1,3-(11-hydroxyundecanoic-acid-1)

$$CH_3CH.(OH)CH_2.CH_2.O(CH_2)_{10}COOH$$

are converted into lactone as described sub Example 1. Same is obtained at a yield of 70% of theory.

Its physical constancies are: Boiling point; under a pressure of 0.01 mm.=81°–84° C.; density—

$$d_4^{18} = 0.9744$$

It smells intensively of musk.

What I claim is:

1. A method of preparing the lactone of the monoether of diethyleneglycol-(11-hydroxyundecanoic acid-1) consisting in slowly adding this ether to the reflux of a benzene solution of benzenesulfonic acid, distilling off the water-benzene mixture which forms, washing the solution with water and an alkali, distilling off the benzene in a vacuum, extracting the lactone from the residues by means of a lactone solvent, and finally rectifying the lactone by vacuum distillation.

2. A method of preparing the lactone of the monoether of trimethyleneglycol-(11-hydroxyundecanoic acid-1) consisting in dissolving said monoether in benzene, boiling the resulting dissolution, then adding thereto dehydrated benzenesulfonic acid, heating during several hours, distilling off the water-benzene mixture which forms, washing the solution with water and an alkali, distilling off the benzene in a vacuum, extracting the lactone from the residues by means of a lactone solvent, and finally rectifying the lactone by vacuum distillation.

3. A method of preparing the lactone of the monoether of butyleneglycol-1,3-(11-hydroxy undecanoic acid-1) consisting in slowly adding this monoether to the reflux of a benzene solution of benzenesulfonic acid, distilling off the water-benzene mixture which forms, washing the solution with water and an alkali, distilling off the benzene in a vacuum, extracting the lactone from the residues by means of a lactone solvent, and finally rectifying the lactone by vacuum distillation.

4. As a new product the lactone of the monoether of diethyleneglycol-(11-hydroxy undecanoic-acid-1) having a distinct smell of musk, boiling at 0.2 mm. pressure at 134° C. and having a density $$d_4^{23} = 1.017$$

and a refraction index $$n_D^{23} = 1.4662$$

5. As new products, the lactones of the monoether of glycols containing three to five carbon atoms and 11-hydroxyundecanoic acid.

6. A lactone of the following formula:

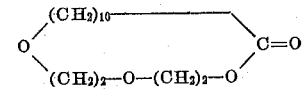

7. A saturated aliphatic ether lactone having at least thirteen members in the ring and at least two ether linkages.

8. Saturated aliphatic ether lactones having at least thirteen members in the ring.

9. A method of preparing the lactones of the monoethers of aliphatic glycols containing two to four carbon atoms in the molecule and 11 hydroxyundecanoic-acid-1, comprising heating the said ethers in a benzene solution of benzolsulphonic acid and distilling off the formed water-benzene mixture.

10. A method of preparing a saturated ether lactone comprising mixing a hydroxycarboxylic acid in an organic solvent, said acid having the formula HO—R—COOH, where R denotes an aliphatic radical having a chain of at least 10 carbon atoms and at least one ether linkage, heating the mixture to homogeneously dissolve the acid in the solvent and to form the lactone, the dilution of the solution corresponding to the desired yield of the lactone and finally extracting the lactone.

11. A method as claimed in claim 10, wherein a water eliminating catalyst is added to the solvent, said solvent forming azeotropic mixtures with water which distill off at lower temperatures than water alone.

12. A method of preparing the saturated ether lactone of a hydroxycarboxylic acid having the formula HO—R—COOH, where R denotes an aliphatic radical having a chain of at least 10 carbon atoms and at least one ether linkage, consisting in adding the acid to the reflux of a benzene solution of benzene-sulfonic acid, distilling off the water-benzene mixture which forms, washing the solution with water and an alkali, distilling off the benzene in a vacuum, extracting the lactone from the residues by means of a lactone solvent, and finally rectifying the lactone by vacuum distillation.

ROGER FIRMENICH.